US009778778B2

(12) United States Patent
Helmes et al.

(10) Patent No.: US 9,778,778 B2
(45) Date of Patent: Oct. 3, 2017

(54) REMOVABLE INPUT/OUTPUT MODULE WITH ADJUSTMENT MECHANISM

(71) Applicant: Microsoft Technology Licensing, LLC, Redmond, WA (US)

(72) Inventors: John Franciscus Marie Helmes, Steyl (NL); Stuart Taylor, Cambridge (GB); Stephen E Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/553,195

(22) Filed: Nov. 25, 2014

(65) Prior Publication Data
US 2016/0147359 A1    May 26, 2016

(51) Int. Cl.
| | | |
|---|---|---|
| *G06F 3/00* | (2006.01) | |
| *G06F 3/041* | (2006.01) | |
| *G06F 1/16* | (2006.01) | |
| *A63F 13/24* | (2014.01) | |
| *A63F 13/23* | (2014.01) | |
| *A63F 13/2145* | (2014.01) | |

(52) U.S. Cl.
CPC ........ *G06F 3/0416* (2013.01); *A63F 13/2145* (2014.09); *A63F 13/23* (2014.09); *A63F 13/24* (2014.09); *G06F 1/1632* (2013.01)

(58) Field of Classification Search
None
See application file for complete search history.

(56) References Cited

U.S. PATENT DOCUMENTS

| | | | |
|---|---|---|---|
| 8,529,357 B2 | 9/2013 | Joynes et al. | |
| 2002/0155890 A1* | 10/2002 | Ha | A63F 13/06 463/36 |
| 2011/0260969 A1 | 10/2011 | Workman | |
| 2012/0271967 A1* | 10/2012 | Hirschman | G06F 3/0219 710/8 |
| 2013/0095925 A1 | 4/2013 | Xu | |
| 2013/0120258 A1* | 5/2013 | Maus | G06F 3/044 345/161 |
| 2013/0184077 A1 | 7/2013 | Galpern | |
| 2013/0267322 A1* | 10/2013 | South | A63F 13/06 463/38 |

(Continued)

OTHER PUBLICATIONS

PCT Search Report mailed Jan. 14, 2015 for PCT application No. PCT/US2015/060779, 12 pages.

(Continued)

*Primary Examiner* — Dimary Lopez Cruz
*Assistant Examiner* — Zhengfu Feng
(74) *Attorney, Agent, or Firm* — Arent Fox LLP (57) ABSTRACT

A removable input/output module for a touch-screen device is described. The input/output module comprises a front plate, a rear plate and an edge plate. When attached to the touch-screen device, the front plate contacts with the front face of the touch-screen device, the rear plate contacts with the rear face of the touch-screen device and the edge plate contacts at least an upper part of an edge face of the touch-screen device. The input/output module further comprises a mechanism which provides a force to clamp the front and rear plates onto the touch-screen device and an adjustment mechanism which allows the relative position of the front plate and the edge plate to be adjusted.

20 Claims, 9 Drawing Sheets

(56) References Cited

U.S. PATENT DOCUMENTS

2014/0206451 A1* 7/2014 Helmes ................ G06F 1/1632
463/39
2014/0274394 A1 9/2014 Willis

OTHER PUBLICATIONS

"International Preliminary Report on Patentability Issued in PCT Application No. PCT/US2015/060779", Mailed Date: Nov. 10, 2016, 8 Pages.
"Gametel", Sep. 17, 2014 Available at: http://www.gametel.se/.
Gorman, Michael, "Gametel Bluetooth Mobile Controller", Published on: Aug. 30, 2012 Available at: http://www.gametel.se/.
"MOGA Ace Power", Sep. 17, 2014 Available at: http://www.mogaanywhere.com/ace/.
"MOGA Pocket Controller", Sep. 17, 2014 Available at: http://store.mogaanywhere.com/Products/CPFA000253-01.
"NVidia Shield", Sep. 17, 2014 Available at: http://shield.nvidia.com/.
"Razer Junglecat—Mobile Game Controller for the iPhone", Sep. 17, 2014 Available at: http://www.razerzone.com/gaming-controllers/razer-junglecat.
"Steelseries Stratus Wireless Gaming Controller", Sep. 17, 2014 Available at: http://steelseries.com/us/products/controllers/steelseries-stratus-wireless-gaming-controller.
"SMACON", Sep. 17, 2014 Available at http://www.sma-con.com/en/.
"Ion iCade", Sep. 17, 2014 Available at: http://www.ionaudio.com/products/details/icade.
"Samsung Smartphone GamePad", Sep. 17, 2014 Available at: http://www.samsung.com/uk/consumer/mobile-devices/smartphones/smartphone-accessories/EI-GP2OHNBEGWW.
"Range of iPega Controllers", Sep. 17, 2014 Available at: http://www.amazon.co.uk/s/?ie=UTF8&keywords=ipega+controller&tag=mh0a9-21&index=aps&hvadid=3170930385&ref=pd_sl_8cqpt3usal_ee.
"Bluetooth Game Controller, The Dronel", Sep. 17, 2014 Available at: http://www.roms4droid.com/index.php/bluetooth-game-controller-the-drone/.
"GameVice", Sep. 17, 2014 Available at http://www.gamevice.com/.
"Phonejoy", Sep. 17, 2014 Available at: http://phonejoy.com/.
Lefebvre, Rob, "First Two iOS 7 Game Controllers Teased by Logitech, ClamCase", Published on: Sep. 19, 2013 Available at: http://www.cultofmac.com/246399/first-two-ios-7-game-controllers-teased-by-logitech-clamcase/.
Tyson, Mark, "GameKlip Clips a PS3 Controller to your Android Phone", Published on: Aug. 7, 2012 Available at: http://hexus.net/gaming/news/android/43409-gameklip-clips-ps3-controller-android-phone/.
Davidson, Andrew, "XOPAD Open Source Android USB Controller gets into the Game", Published on: Feb. 5, 2013 Available at: http://www.gizmag.com/xopad-open-source-usb-game-controller-android/26095/.
Ayeleasebee, "iFrogz to unveil $70 Caliber Advantage mobile gaming controller; Belkin to display new $80 and $50 iPad keyboard cases", Published on: Jan. 8, 2013 Available at: http://9to5mac.com/2013/01/08/ifrogz-to-unveil-70-caliber-advantage-mobile-gaming-controller-belkin-to-display-new-80-and-50-ipad-keyboard-cases/.
Reid, Ben, "This Gaming Controller for the iPad mini, Nexus 7 Looks Stunning [Video]", Published on: Apr. 12, 2013 Available at: http://www.redmondpie.com/game-d-controller-for-ipad-mini-and-nexus-7-video/.
"Pocket Gamer: Video Game Controller for iPhone", Sep. 9, 2014 Available at: https://www.kickstarter.com/projects/1685918106/pocket-gamer.
Thukral, Hitesh, "WikiPad first glasses-free 3D Android tablet with attachable game controller", Sep. 9, 2014 Available at: http://techwrldinfo.blogspot.in/2012/01/wikipad-first-glasses-free-3d-android.html.

* cited by examiner

REMOVABLE INPUT/OUTPUT MODULE WITH ADJUSTMENT MECHANISM

BACKGROUND

There are large numbers of computing devices that have touch-sensitive screens which allow users to interact using touch gestures directly on the device's screen. Examples include smartphones, tablet computers, large interactive surface computers and touch-sensitive displays for desktop computers. In some applications, this interface provides an adequate user input mechanism.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A removable input/output module for a touch-screen device is described. The input/output module comprises a front plate, a rear plate and an edge plate. When attached to the touch-screen device, the front plate contacts with the front face of the touch-screen device, the rear plate contacts with the rear face of the touch-screen device and the edge plate contacts at least an upper part of an edge face of the touch-screen device. The input/output module further comprises a mechanism which provides a force to clamp the front and rear plates onto the touch-screen device and an adjustment mechanism which allows the relative position of the front plate and the edge plate to be adjusted.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

There are many devices which comprise a flat, continuous interaction surface (a touch-sensitive screen), including mobile/handheld devices (e.g. smartphones, tablet computers, phablets, portable games consoles) and larger, non-portable devices (e.g. surface computing devices and touch-sensitive displays for desktop computers). These devices are referred to herein as 'touch-screen devices'. The lack of physical reference points, boundaries or tactile feedback provided by the touch-sensitive screen (unlike with physical buttons) can cause problems for some applications (e.g. games) and for some users (e.g. those with a visual impairment). It is easy for a user's fingers to move when playing a game so that the fingers are no longer aligned with the game's input controls and this is exacerbated where the game requires rapid or frequent input. Additionally, when in position, the user's fingers may obscure areas of the screen and this may impact usability, particularly for smaller form factor devices (e.g. smartphones). Furthermore, it may be difficult for an application developer to arrange all the requisite input controls on the touch-sensitive screen in a layout which is comfortable for a user when using the application for a prolonged period (e.g. half an hour or more), i.e. it may be difficult to provide an ergonomic arrangement of input controls on a flat interaction surface.

The embodiments described below are not limited to implementations which solve any or all of the disadvantages of known user input devices.

A removable input/output module for a touch-screen device is described herein which can be adjusted to accommodate touch-screen devices with different dimensions (e.g. width of the non-display border around the display area and/or device thickness). The module can be temporarily attached around the periphery of a touch-screen device (e.g. for a period of time when a user wishes to use it) and comprises one or more input controls (e.g. joystick, button, etc.) which are mapped to software (e.g. the operating system or an application) running on a computing device and/or one or more output devices (e.g. to provide haptic feedback) which are controlled by software running on the computing device. Where the touch-screen device is a touch-screen computing device (e.g. a smartphone, tablet computer, etc.), the inputs are mapped to software running on the touch-screen computing device and where the touch-screen device is a peripheral (i.e. a touch-screen peripheral device) for a computing device (e.g. a touch-sensitive display for a desktop computer), the inputs are mapped to software running on that computing device. Subsequently (e.g. when the user has finished interacting with the touch-screen device or when the module is not needed), the module can be detached from the touch-screen device and stored until it is next used by the user (e.g. connected to the same touch-screen device or a different touch-screen device).

Examples of touch-screen computing devices include mobile/handheld devices (e.g. smartphones, tablet computers, portable games consoles) and larger devices (e.g. large form-factor tablet computers, surface computing devices, a touch-sensitive device integrated into an appliance or vehicle, touch-sensitive televisions). Examples of touch-screen peripheral devices include touch-sensitive displays for desktop computers, a thin client tablet, a smart phone operating as a thin client display for a gaming console etc. While many of the following examples refer to a touch-screen computing device, this is by way of example. The examples may also be applied to a touch-screen peripheral device, in which case any data communication is between the input module and the computing device to which the touch-screen peripheral device is connected.

Figure 1:
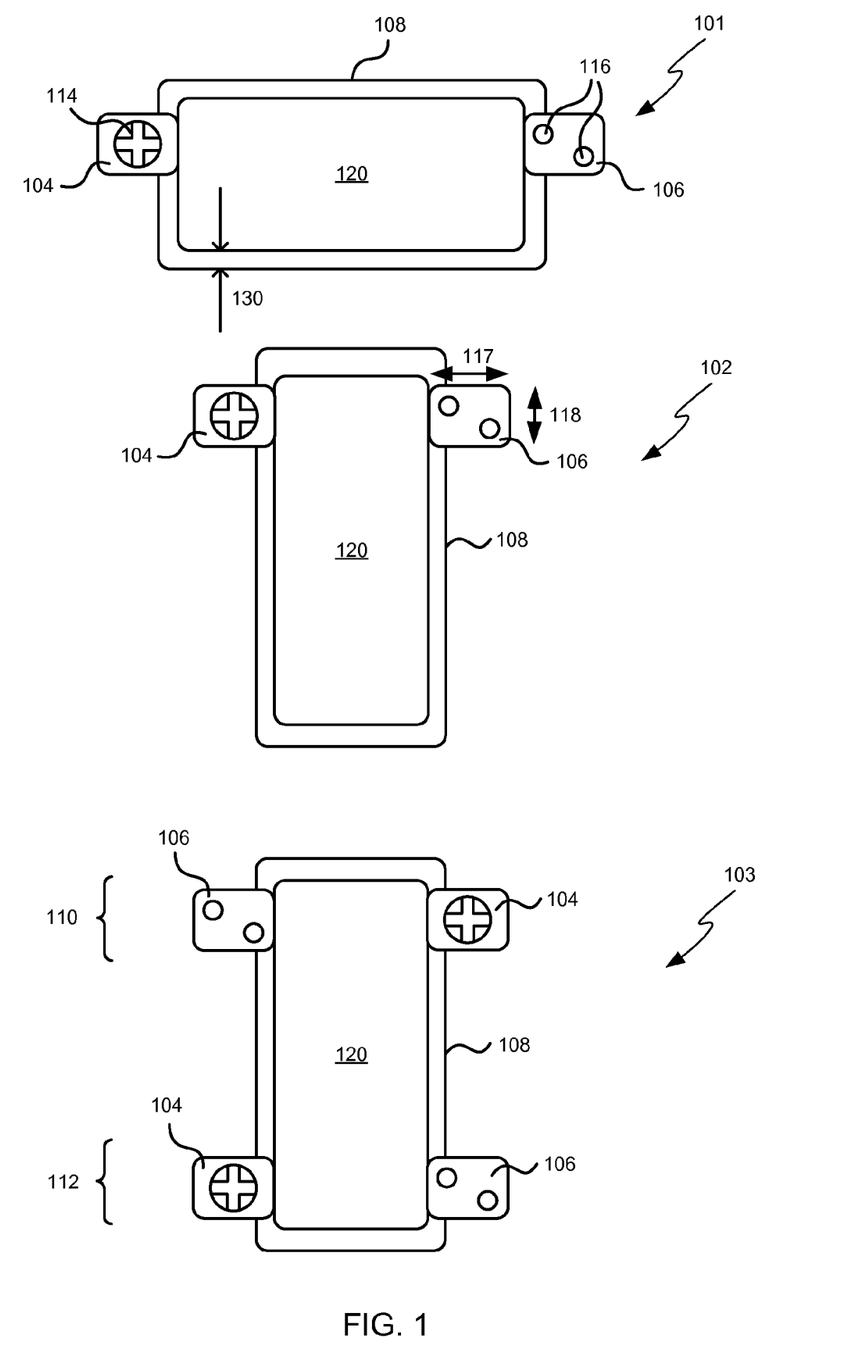
FIG. 1 shows three schematic diagrams of reconfigurable input modules attached around the periphery of a touch-screen device.

FIG. 1 shows three schematic diagrams 101-103 in which reconfigurable input modules 104, 106 are attached around the periphery of a touch-screen device 108 (i.e. around the edge of the display), which may, for example, be a portable or handheld device such as a tablet (of any size) or smartphone or a fixed touch-screen device (e.g. on an appliance or in a vehicle). In the first diagram 101, the touch-screen device 108 is oriented in landscape and one input module 104, 106 is attached on each of the short sides of the device (i.e. on the short sides of the face of the device which includes the display). In the second diagram 102, the touch-screen device 108 is in portrait orientation and the input modules 104, 106 are attached on the long sides of the device. In the third diagram 103, there are four input modules 104, 106 which are arranged at each end of the touch-screen device 108 and which may provide a pair of input modules 110 for use by a first user and a pair of input modules 112 for use by a second user, for example when playing a two player game on the touch-screen device 108. Alternatively, the four input modules in the third diagram 103 may be used by a single user.

As shown by the three examples in FIG. 1, the input modules 104, 106 can be placed anywhere around the periphery of the touch-screen device 108 and may be rearranged by a user depending on the application displayed/running on the device, personal preference, or any other factor. Consequently, the modules may be described as reconfigurable (e.g. a user can choose where to place the modules and can move them if they wish). Although the examples in FIG. 1 show use of two and four modules, in other examples, a single module may be used or any other number of modules may be used by one or more concurrent users of the touch-screen device.

Each input module 104, 106 comprises an input control which may, for example, be a tactile input control, such as a physical control (e.g. one with a contoured profile which may move when pressure is applied by a user) which provides tactile feedback to a user that their finger/thumb is correctly positioned on the control. In other examples, the input control may not be tactile and instead may comprise an optical sensor, capacitive sensor or other sensor. In further examples, a combination of tactile and non-tactile input controls may be provided. It will be appreciated that the examples shown in FIG. 1 (a four-way control and a pair of buttons) are just examples of the input controls that may be provided on an input module. Further examples include, but are not limited to, a rotary knob, a slider, a single button (or different number of buttons), a switch and a small joystick. Examples of sensors which may be used include, but are not limited to, a hover sensor for hand position (e.g. based on reflecting IR or seeing IR shadows or thermal IR sensing or based on ultrasound), a magnetometer for sensing distortions due to rings worn on hands, or any other type of sensor that can detect a characteristic of the human (e.g. a galvanic skin response sensor or heart rate sensor) or a characteristic of something the human is wearing. If the device (e.g. the touch-screen device or the module) is flexible or articulatable, then the sensors may detect how the user flexes or articulates the device, e.g. using an accelerometer.

Each input control 114, 116 is mapped to a user input of an application or other program (e.g. the operating system or any other software) displayed/running on the touch-screen device 108. The user inputs to which an input control 114, 116 is mapped may be a touch-event (i.e. a user input that a user would usually provide by touching the touch-sensitive display) or may be an input via a physical button or control on the touch-screen device 108 or any input via a supported peripheral (e.g. a Bluetooth keyboard) or any other supported hardware (where the hardware need not be present but only be supported by the program receiving the user input). In some examples, the user inputs may be keystrokes such that the input/output modules may be used instead of an onscreen keyboard.

Where there are multiple input controls, as in the examples shown in FIG. 1, each input control may be mapped to a different user input of the same application/program or the input controls may be mapped to user inputs of two or more applications/programs. In an example, both the four-way control 114 and buttons 116 may be mapped to user inputs of a game which is displayed or running on the touch-screen device. In another example, the four-way control 114 may be mapped to a user input of a game running on the touch-screen device 108 (or a cloud-based game which is displayed on the touch-screen device) and the buttons 116 may be mapped to functions within the operating system (OS) of the device, such as volume controls. In a further example, the four-way control 114 may be mapped to a user input of an application displayed/running on the touch-screen device 108 and one of the buttons may be mapped to a particular input in another application (e.g. an 'answer' button in an IP telephony application). The mapping may be fixed, dynamic or a combination of both fixed and dynamic (e.g. with a first subset of controls having a fixed mapping and a second subset of controls being dynamically mapped, where each subset does not comprise all of the controls). There may be a number of factors which influence the mapping and these may include the position of an input/output module, the relative position of more than one input/output module, the particular application (or other program) which is visible on the screen (or uppermost, where multiple applications are visible), user input, etc.

In the examples shown in FIG. 1, the input control is on the front face of a module (i.e. on the face which is substantially parallel to the touch-screen display in use or when the module is attached to the device). Alternatively, an input control may be provided on another face of the module or a corner of the module in addition to, or instead of, an input control on the front face (e.g. to provide finger trigger buttons on a top side of a module and/or tactile controls on a rear surface of the display). For example, an input control may be provided on both the front and rear faces.

In various examples, one or more of the modules may also comprise an output device such as a visual indicator (e.g. a small display or one or more LEDs), audible indicator (e.g. a small speaker or buzzer or headphone socket), tactile (or haptic) feedback device (e.g. a vibration mechanism, any physical movement actuator or a movement retarder if the touch-screen device or module is flexible or articulatable) or other sensory feedback device (e.g. a heating/cooling device, such as a Peltier cooler, which can provide feedback by changing the temperature of a module or chemical outputs for smells, hormones, etc.).

When positioned around the periphery of a touch-screen device 108 (and physically attached to the touch-screen device), the input modules 104, 106 obscure little or none of the actual display area 120 and in the examples shown in FIG. 1, the modules 104, 106 do not obscure any of the actual display area 120 but instead only obscure the non-display border region (with a width labelled 130 in FIG. 1). This means that there is more real estate on the screen for viewing and increases ease of use. Different touch-screen devices have different widths of non-display border region (where this border may also be referred to as the 'throat') and as described in more detail below, input modules 104, 106 comprise an adjustment mechanism which enables the amount by which the module obscures the display face to be changed to accommodate different border widths. Some devices may have no non-display border (i.e. width=zero) and the input module may be adjusted to minimize the amount of display area which is obscured when the module is attached, whilst still providing a stable fixing to the touch-screen device.

It will be appreciated that FIG. 1 is not necessarily drawn to scale, however, in various examples the modules are compact and have dimensions (e.g. the length of a side of the front face, as indicated by arrows 117, 118) which are considerably smaller than the touch-screen device 108 to which they attach. For example, the front face of the modules may be approximately 1 inch (2.54 cm) square and used with touch-screen displays ranging from around 3 inches (~7.5 cm) to 10 inches (~25 cm) or more (where the screen size is measured on the diagonal). Although FIG. 1 shows all the modules being approximately the same shape and size, in some examples, the modules within a set may be of different sizes and/or shapes.

Figure 2:
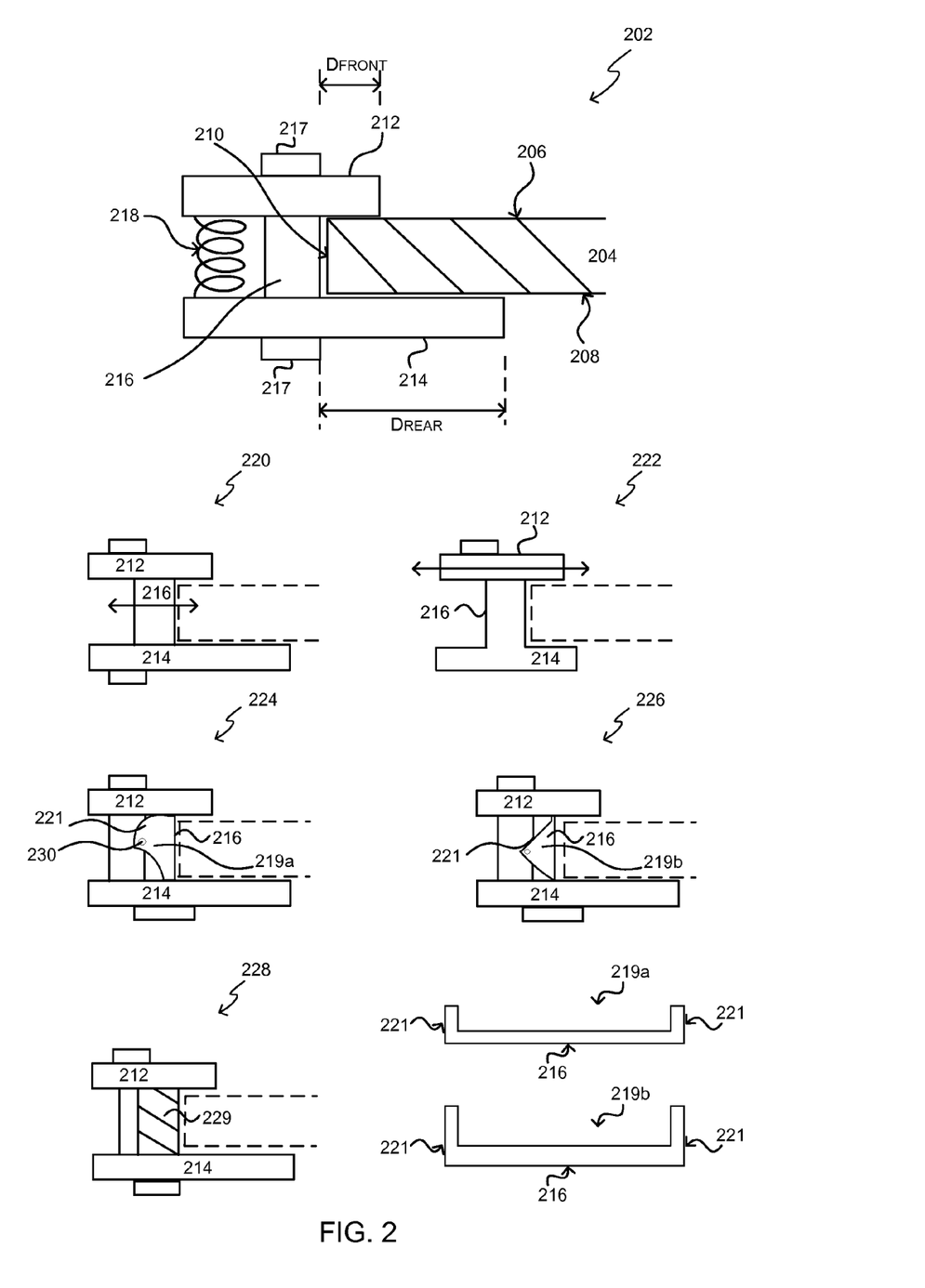
FIG. 2 shows schematic diagrams of various example removable input modules in cross-section.

FIG. 2 shows schematic diagrams of various example removable input modules in cross-section. The first example removable input module 202 is shown attached to a touch-screen device 204; however, for clarity the other examples show a dotted outline only of the position of a touch-screen device 204. The touch-screen device 204 comprises a touch-sensitive display face 206 (which may also be referred to as the front face) and a rear face 208. The touch-screen device 204 further comprises an edge face 210 which connects the front and rear faces 206, 208 and around which the input module 202 is attached.

The first example input module 202 comprises front plate 212 which is configured to contact the front face 206 of the touch-screen device 204 when the input module 202 is attached to the touch-screen device 204. The input module 202 also comprises a rear plate 214 which is configured to contact the rear face 208 of the touch-screen device 204 when the input module 202 is attached to the touch-screen device 204. The input module 202 further comprises an edge (or alignment) plate 216 which is configured to contact at least part of the edge face 210 of the touch-screen device 204 proximate to the front face 206 when the input module 202 is attached to the touch-screen device 204. The input module 202 further comprises one or more input controls 217 and a clamp mechanism 218 (e.g. a sprung mechanism) which provides a clamping force to grip (or pinch) the front and rear faces 212, 214 onto the touch-screen device 204. Although the clamp mechanism 218 is shown as a spring in FIG. 2, this is by way of example only and any suitable clamping arrangement may be used (e.g. a clamp mechanism comprising a pivot arrangement).

Figure 3:
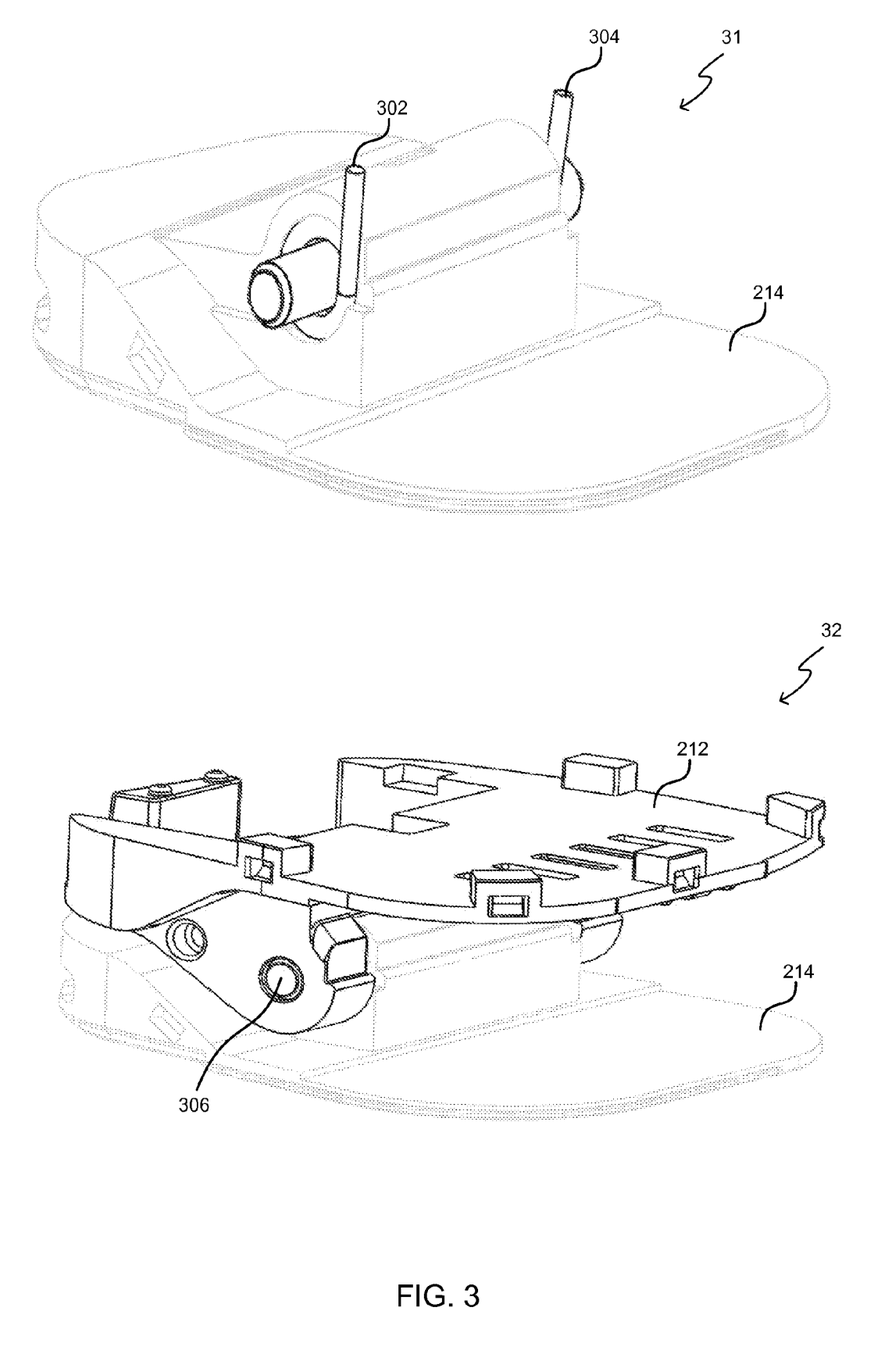
FIG. 3 shows schematic diagrams of an example clamping mechanism in detail.

FIG. 3 shows schematic diagrams of an example clamping mechanism. In this example two springs 302, 304 are used as can be seen in the upper diagram 31 which shows only the rear plate 214. One of the springs 302, 304 is a left-hand turn spring and the other is a right-hand turn spring and they are mechanically held in place by features in the bottom half of the module. A shaft 306 (as shown in the lower diagram 32) connects the bottom and top halves and the ends of the springs 302, 304 apply the clamping force onto the top half, forcing it down towards the bottom half. The use of two springs (one left-hand and one right-hand turn) ensures a parallel force is applied onto the device (e.g. the touch-screen device) to which the module is attached. The parallel force means that the friction on the touch-screen device is increased (compared to using a single spring and a non-parallel clamping force).

In the first example input module 202 shown in FIG. 2, the rear plate 214 extends further beyond the edge plate 216 (a distance labelled $D_{rear}$) than the front plate 212 (a distance labelled $D_{front}$, such that $D_{rear} > D_{front}$) which enables the rear face to provide stability against rotation of the input module in a plane perpendicular to the display of the touch-screen device whilst reducing the amount of display area which is obscured by the input module. However in other examples, the front and rear plates 212, 214 may extend the same distance beyond edge plate 216 (e.g. $D_{rear} = D_{front}$) or the front plate 212 may extend further than the rear plate 214 (e.g. $D_{rear} < D_{front}$). In all the example input modules described herein an adjustment mechanism is provided to enable the distance by which the front plate 212 extends beyond the edge plate 216 (i.e. the value of $D_{front}$) to be adjusted/changed (e.g. to increase and/or to decrease the value of $D_{front}$). The distance by which the rear plate 214 extends beyond the edge plate 216 (i.e. the value of $D_{rear}$) may be fixed or may be adjustable (e.g. via the adjustment mechanism or a separate mechanism).

The remaining examples 220-228 in FIG. 2 show different implementations of the adjustment mechanism described above. In the second example 220, the adjustment mechanism enables the edge plate 216 to be moved relative to both the front plate 212 and the rear plate 214 (as indicated by the double-ended arrow in FIG. 2). In the third example 222, the adjustment mechanism enables the front plate 212 to be moved relative to the edge plate 216 and the rear plate 214 (as indicated by the double-ended arrow in FIG. 2). In this example, the edge plate 216 and the rear plate 214 are fixed together or may be a single piece comprising both the edge plate and the rear plate. In the second and third examples a ratchet mechanism comprising interlocking sets of teeth which can be moved relative to each other (e.g. when the two sets of teeth are separated) and then clamped together to prevent slipping may be used. Such a mechanism allows the relative position of the front and edge plates of the input module to be changed and then held firmly in the new position.

The fourth and fifth examples 224, 226 in FIG. 2 show an attachment mechanism which comprises a removable insert 219a, 219b. Each removable insert (which is also shown separately in FIG. 2) comprises the edge plate 216 (i.e. the part of the input module that contacts at least a part of the edge face of the touch-screen device proximate to the front face of the touch-screen device) and a connecting arm 221 at each end of the edge plate 216. As shown in FIG. 2, the different removable inserts 219a, 219b have different lengths of connecting arms 221 (example 219a has shorter connecting arms than example 219b) which therefore adjusts the position of the front plate with respect to the edge plate.

Each connecting arm 221 comprises a connecting mechanism to attach the insert to the input module 224, 226 (in the example shown, an arrangement of pegs and recesses are used to enable inserts to be removably clipped into place). In a variation on the fourth and fifth examples, instead of having removable inserts, a single insert may be used which has connecting arms which can be adjusted such that their length varies (e.g. such that the lengths of the arms 221 can be extended from a short length as shown by insert 219a to a longer length as shown by insert 219b).

In some examples, the inserts may be able to pivot (e.g. about attachment point 230) such that the angle of the edge plate may change depending upon the shape of the edge of the device 204 it is pressed upon. This may, for example, be used to increase the contact area of the edge plate on a device with a strongly tapered edge. In some examples, different removable inserts may have different angles on their edge plates.

In the sixth example 228 in FIG. 2, the attachment mechanism also comprises removable inserts; however these inserts (or spacers) 229 are a different shape to those in the previous examples and may be described as changing the thickness of the edge plate 216. The inserts are again are used to vary the distance by which the front plate 212 extends beyond the surface (i.e. the edge plate) that contacts at least a portion of the edge face of the touch-screen device.

The edge plate within the input modules described herein provides rotational stability when the input module is attached to the touch-screen device (i.e. it prevents it rotating whilst in use) because it contacts the edge face of the touch-screen device and through use of an adjustment mechanism as described above, different widths of non-display borders on a touch-screen device can be accommodated. Although in many examples, the adjustment mechanism may be adjusted so that the input module does not obscure any of the display area on the front face of the touch-screen device, in some examples, the border may be so narrow (or non-existent) such that the front face of the input module does obscure a small amount of the display area; however, the adjustment mechanism may be adjusted to provide a trade off between obscuring less display area and attaching the input module more securely to the device.

Figure 4:
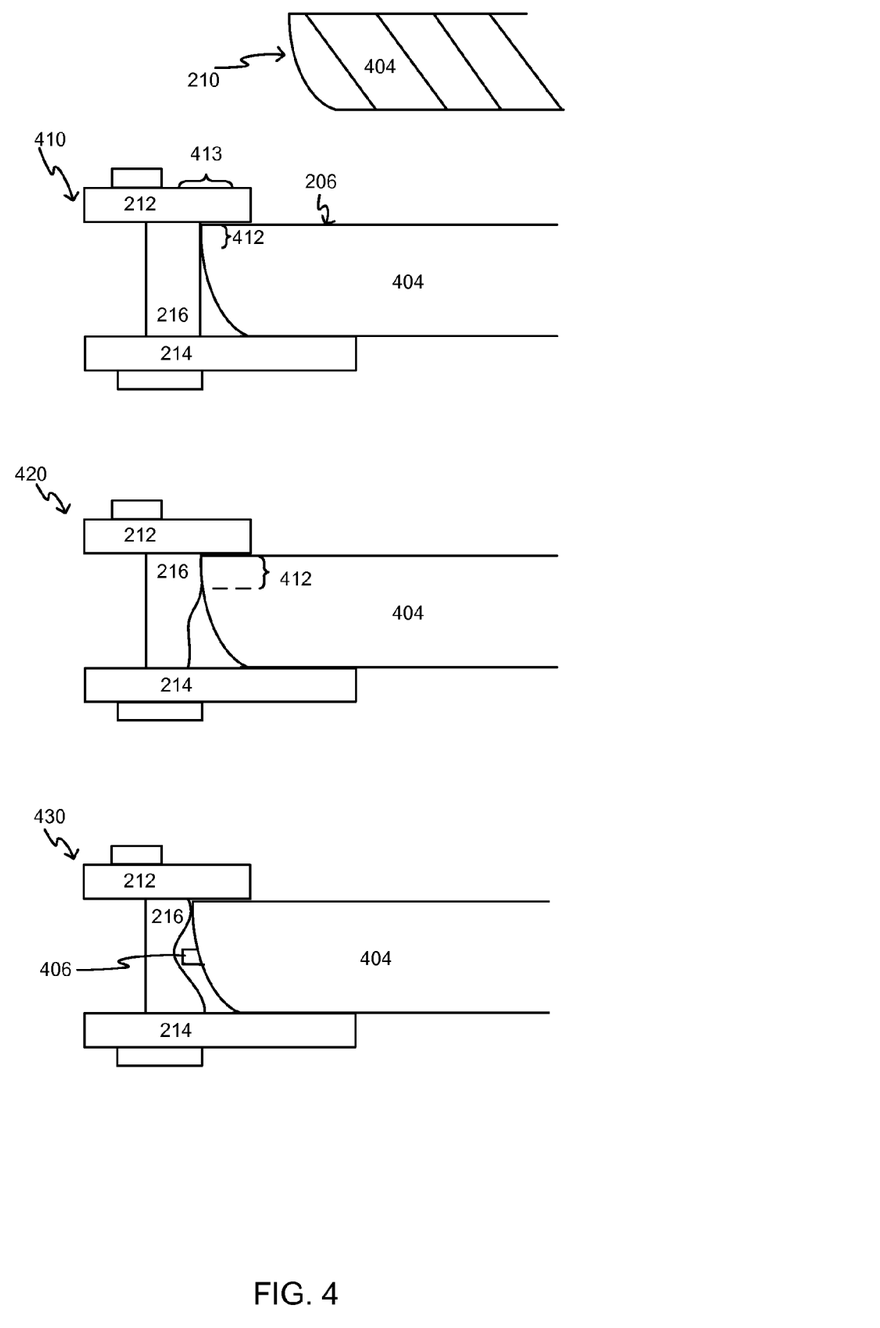
FIG. 4 shows schematic diagrams of further example removable input modules in cross-section.

Although FIG. 2 shows the touch-screen device having a rectangular cross-section with right-angles between the front face 206 and edge face 210 and the edge face 210 and rear face 208, this is by way of example only and it will be appreciated that the thickness of the touch-screen device may taper towards the periphery such that the edge face 210 is not perpendicular to either the front or rear faces 206, 208 and this is shown in the examples in FIG. 4.

FIG. 4 shows a touch-screen device 404 which has a thickness which tapers towards the periphery of the touch-screen device, such that the edge face 210 is not perpendicular to either the front or rear faces 206, 208 (as is the case in the examples shown in FIG. 2) and in this example is curved rather than straight. The first example input device 410 shown in FIG. 4 comprises a straight edge plate 216 which only contacts with a portion 412 of the edge face of the touch-screen device which is proximate to the front face 206 of the touch-screen device 404. In the second example input device 420 shown in FIG. 4, the edge plate 216 also only contacts with a portion 412 of the edge face 210 of the touch-screen device which is proximate to the front face 206 of the touch-screen device 404; however in this second example, the edge plate 216 is not straight but is also shaped (e.g. curved). The shaping of the edge plate 216, may for example provide a recess to accommodate a button 406 on the edge face of the touch-screen device 404 as shown in the third example 430 in FIG. 4. Without the recess provided in the edge plate 216 shown, a user would need to be careful not to attach the input module in the vicinity of the button 406 or risk depressing the button 406 by attaching the input module. Recesses may also be provided within the edge face to accommodate connectors (e.g. power connectors or headphone connectors) and/or cables/wires (e.g. plugged into a socket in the touch-screen device using a connector on the end of the cable). In further examples the edge plate may be shaped to match the tapering of the touch-screen device and this extends the portion 412 over which the edge plate is in contact with the edge face.

All the different examples of adjustment mechanism shown in FIG. 2 are not repeated in FIG. 4; however, it will be appreciated that any aspects of the examples in FIG. 2 (e.g. removable inserts/spacers, movable edge plates, etc.) may be combined with any aspect of the examples in FIG. 4.

In any of the examples described herein, the surfaces on the front and/or rear plates of the input module which contact the touch-screen device (when attached) may be covered in a high friction or other non-slip material (e.g. suction cup tape). In various examples, different non-slip materials may be used on the front and rear plates, with the materials being selected to be compatible with the materials from which the front and rear faces of the touch-screen device are formed (e.g. glass and aluminum respectively).

Through use of an adjustment mechanism within the input module as described herein, an input module can be quickly and easily customized for use with a particular touch-screen device or a particular form factor of touch-screen devices. In various examples the customization may be performed by the user (e.g. when switching between their smartphone and their tablet computer). In other examples, the customization may be performed by the manufacturer or retailer.

Figure 5:
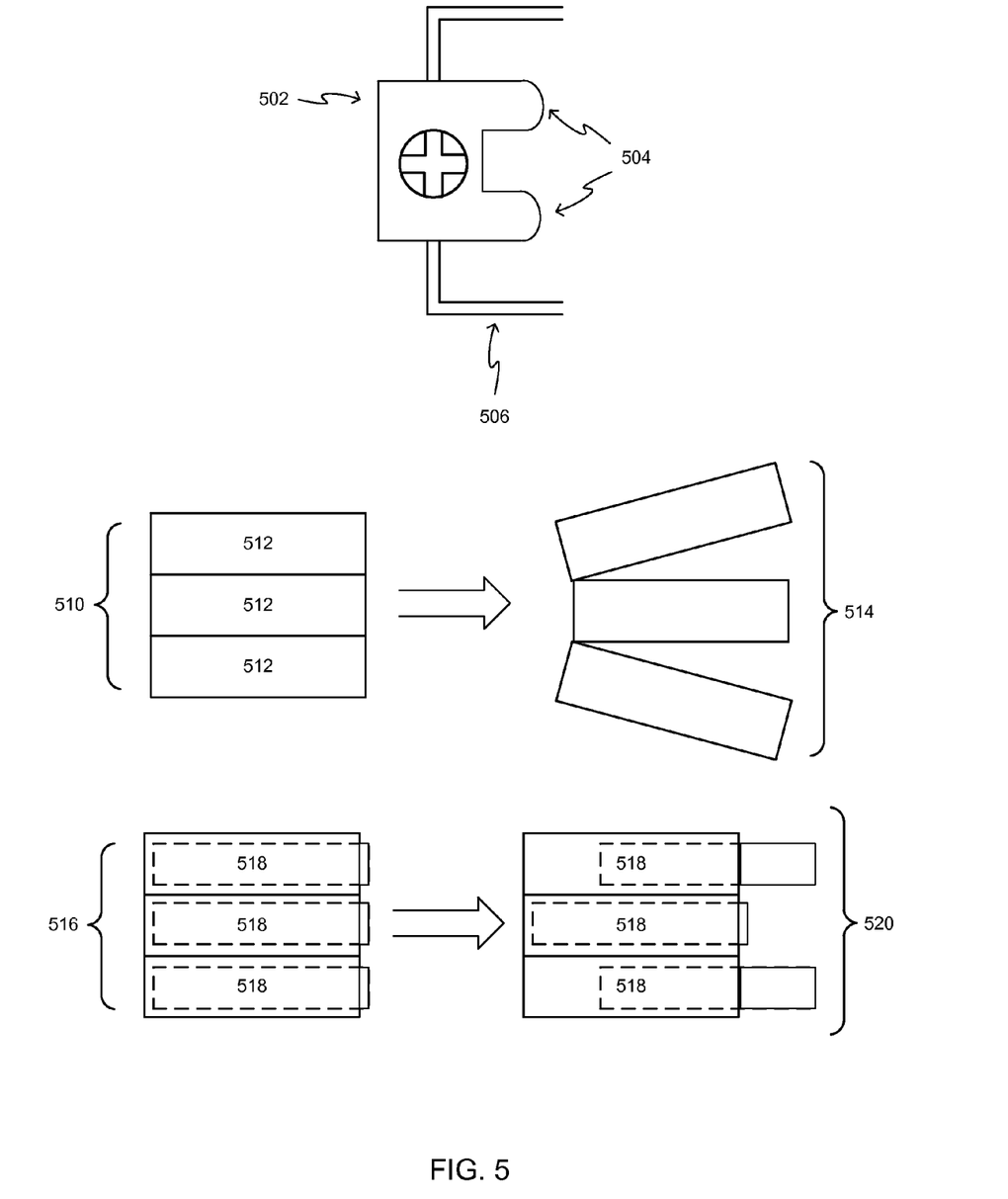
FIG. 5 shows schematic diagrams of other example removable input modules.

In various examples, a part of the front and/or rear plates 212, 214 may be transparent (e.g. the leading edge 413 of the front plate 212 may be transparent or partially transparent) in order that it does not fully obscure the display area for a user in situations where it does overlap the display area. In addition, or instead, the front plate may be shaped to reduce the area which may obscure the display area, whilst maintaining stability of the input module when attached to the touch-screen device. An example of an input module 502 with a shaped front plate is shown in FIG. 5. In this example, the front plate is shaped to have to protruding elements 504 which extend further onto the front face of the touch-screen device 506 than a region between the protruding elements.

In the examples described above, the front and rear plates are of a fixed shape. In the second example in FIG. 5, however, a plate 510 of an input module (which may be the rear plate) is formed from a plurality of fingers 512 which can be pushed together to form a compact plate 510 (e.g. for storage and/or for attaching to a smaller touch-screen device) or spread out to form a wider arrangement 514 which is more stable when clamped to a touch-screen device. In the third example in FIG. 5, a plate 516 of an input module is formed from a plurality of telescopic fingers 518, one or more of which can be extended to form a longer arrangement 520 which is more stable when clamped to a touch-screen device.

In the examples described above, the input modules comprise a mechanism to accommodate different widths of non-display area around the periphery of a touch-screen device (although they may also be used where there is no border and the display area extends to the edges of the device). In various examples, an input module may also be configured to accommodate differences in the thickness (i.e. the distance between the front and rear faces 206, 208) of a touch-screen device and/or to more firmly grip a tapering touch-screen device.

Figure 6:
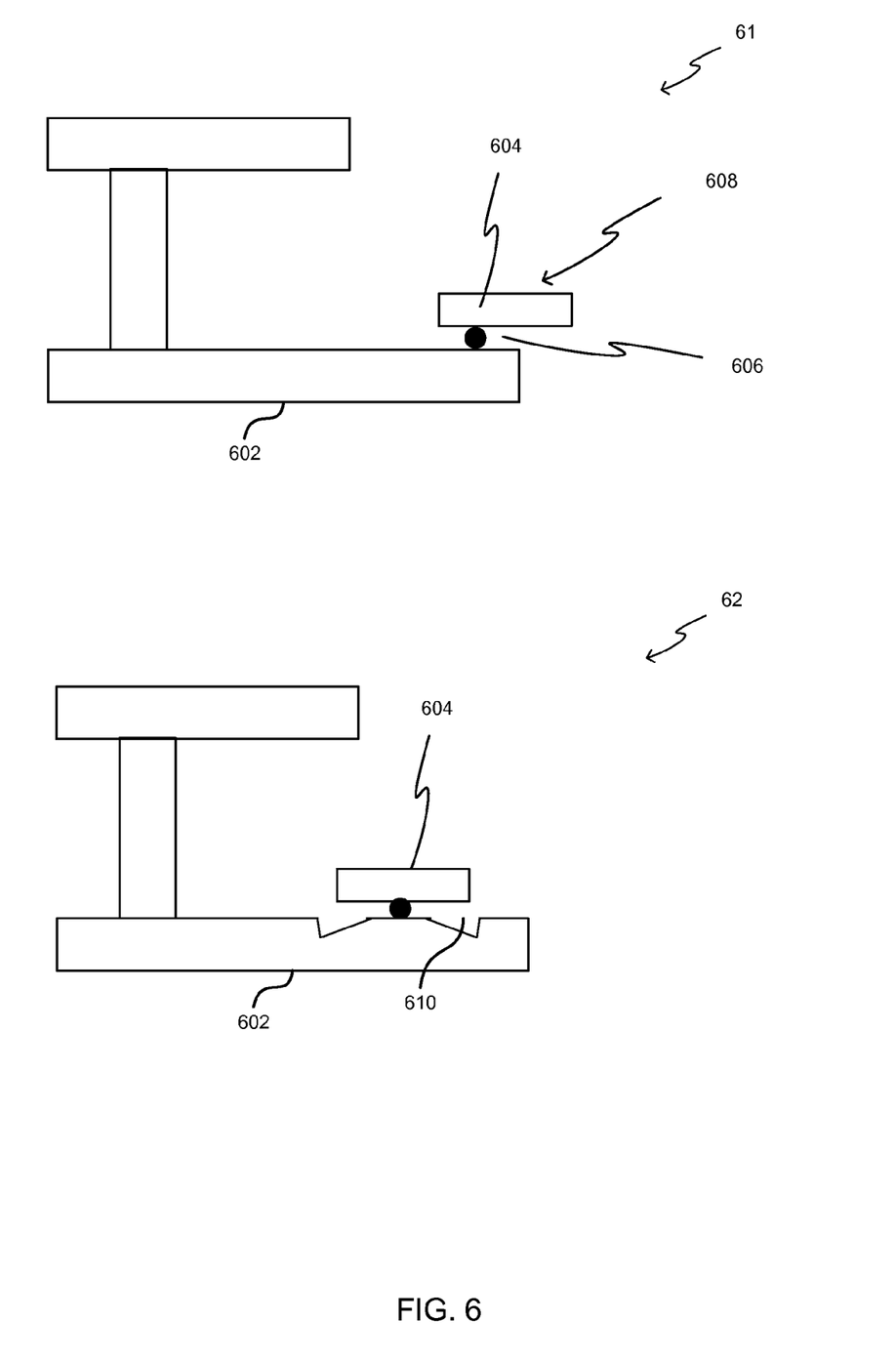
FIG. 6 shows a schematic diagram of another example removable input module in cross-section.

In the examples 61, 62 shown in FIG. 6 the rear plate of the input module comprises a first portion 602 and a second portion 604 connected by means of a pivot/hinge 606 (e.g. a living hinge) or universal joint (e.g. a ball and socket joint or magnetic joint). In various examples, the upper face 608 of the second portion 604 may be covered in a low friction or other non-slip material (e.g. suction cup tape). Through the use of an articulated rear plate, as shown in FIG. 6, the shape of the rear plate can conform to the shape of (and hence attach more securely to) a touch-screen with a rear face which is not planar at the point of contact of the rear plate. Through use of a clamping mechanism such as shown in FIG. 3, a parallel clamping force can be applied. In the examples shown in FIG. 6 the pivot 606 is set back from the end of the first portion 602 such that the rotation of the second portion is limited. In various examples, first portion 602 may be shaped (e.g. through use of recesses 610) to control the amount of rotation of the second portion, as shown in the second example in FIG. 6.

In a variation on the example shown in FIG. 6, the second portion may be removable (i.e. it may be able to be detached from the first portion 602) and different size and shape second portions may be used to accommodate devices of different thickness and/or shape (e.g. to provide different mating angles, where the mating angle is the angle of the portion of the rear face when it contacts the touch-screen device). In further examples, the shape of the second portion may be adjustable (e.g. through extendable elements).

Figure 7:
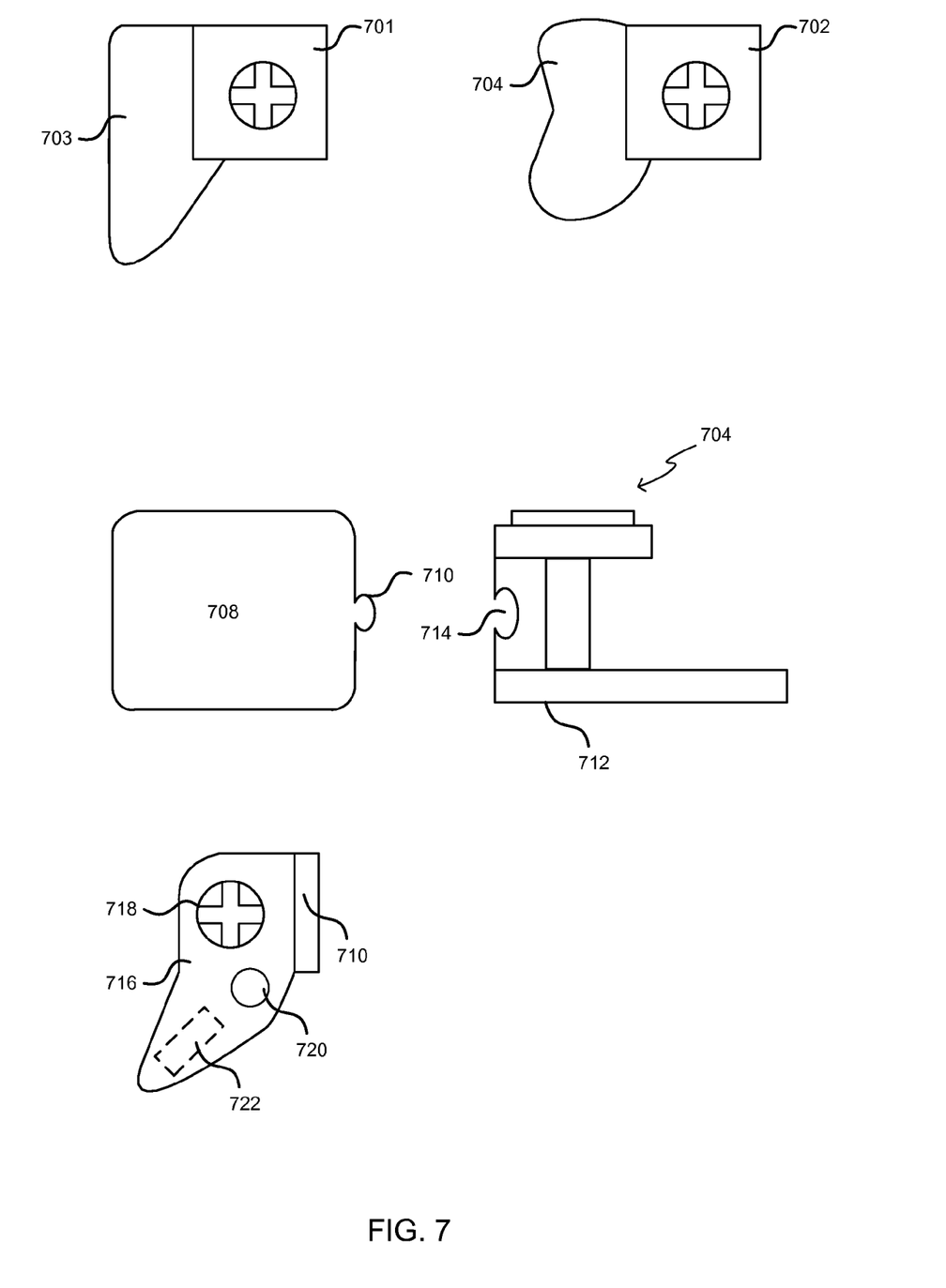
FIG. 7 shows schematic diagrams of removable input modules and detachable extension pieces for the input modules.

The input modules described above provide a compact, removable input module that can be easily attached and detached from a touch-screen device and which minimizes movement (and in particular rotation) of the module whilst in use. For some users and/or some situations, a slightly larger input module may be more ergonomic and different users may want to have different sizes of input modules (e.g. based on hand size). In various examples, an input module may comprise a feature (e.g. a groove or slot) to enable an extension piece to be rigidly attached to the input module and examples of this are shown in FIG. 7. FIG. 7 shows two input modules 701, 702 to which a removable extension piece 703, 704 has been attached. In the examples shown, the extension pieces comprise ergonomically shaped hand grips which may be of different shapes/sizes to suit different users and/or different use scenarios. As shown in the cross-section diagram 704, an extension piece 708 may have an integrally formed protrusion (or ridge) 710 which can be slid into a corresponding slot (or recess) 714 on an input module 712. In other examples, the extension piece may be attached using a different mechanism (e.g. using magnets). In various examples, the extension pieces are passive and do not comprise any electronics (e.g. they are solid or hollow pieces of plastic); however, in other examples an extension piece 716 may provide additional input controls 718, sensors 720 (e.g. temperature sensor, galvanic skin response sensor, etc.), a power source (e.g. a battery which may power the extension piece and/or the input module) and/or output devices 722 (e.g. a vibrating element to provide haptic feedback). In some examples the extension pieces may have a fixed shape, but in other examples they may be hinged or otherwise articulated (e.g. in a similar manner to the plate 510 shown in FIG. 5) to enable a user to store them in a more compact form than the arrangement in which they are used and/or to enable a user to adjust their position and/or shape to fit their preferred hand position. In some examples the extension pieces 703, 704 may be larger than the input modules themselves. By adding and/or changing extension pieces may be able to reconfigure an input module for different applications (e.g. which require a different set of inputs and/or outputs) and/or to customize the input module in any way (e.g. for a particular computer game). The extension pieces may provide a way to upgrade/update the input module to provide new/improved input controls when these are available.

Figure 8:
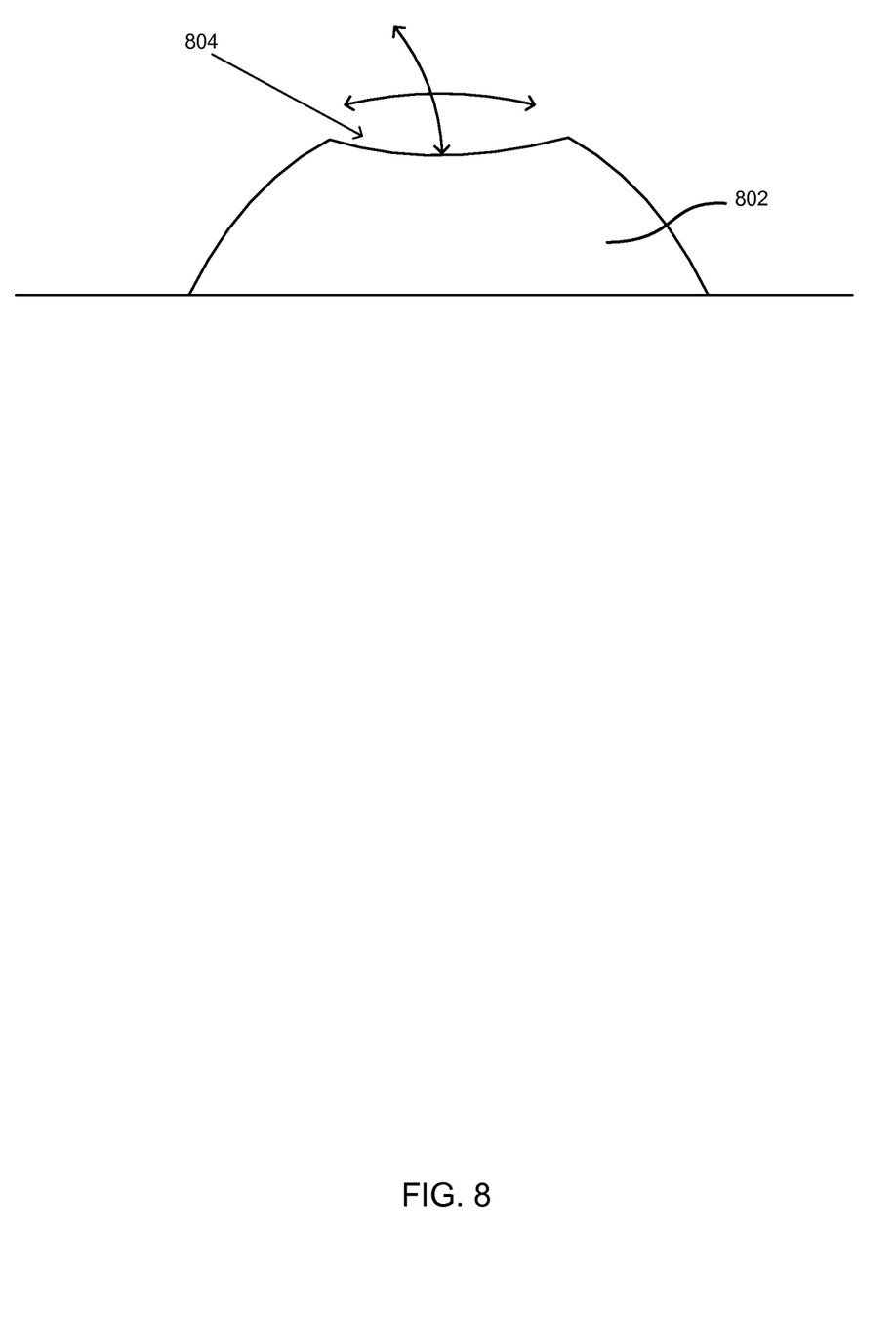
FIG. 8 is a schematic diagram of a low profile joystick.

The input controls provided on an input module and/or an extension piece may have any form (e.g. button, joystick, slider, etc.). In various examples, low profile controls are used to avoid the controls being damaged when not in use (e.g. because the input control catches on something in a user's bag or pocket). FIG. 8 shows an example 802 of a low profile joystick which comprises a depression 804 on the top shaped to receive a user's finger. The depression 804 enables a user to move the joystick and by eliminating the knob used on standard joysticks, the risk of the control being damaged when placed in a bag or slipped into a pocket is reduced.

Figure 9:
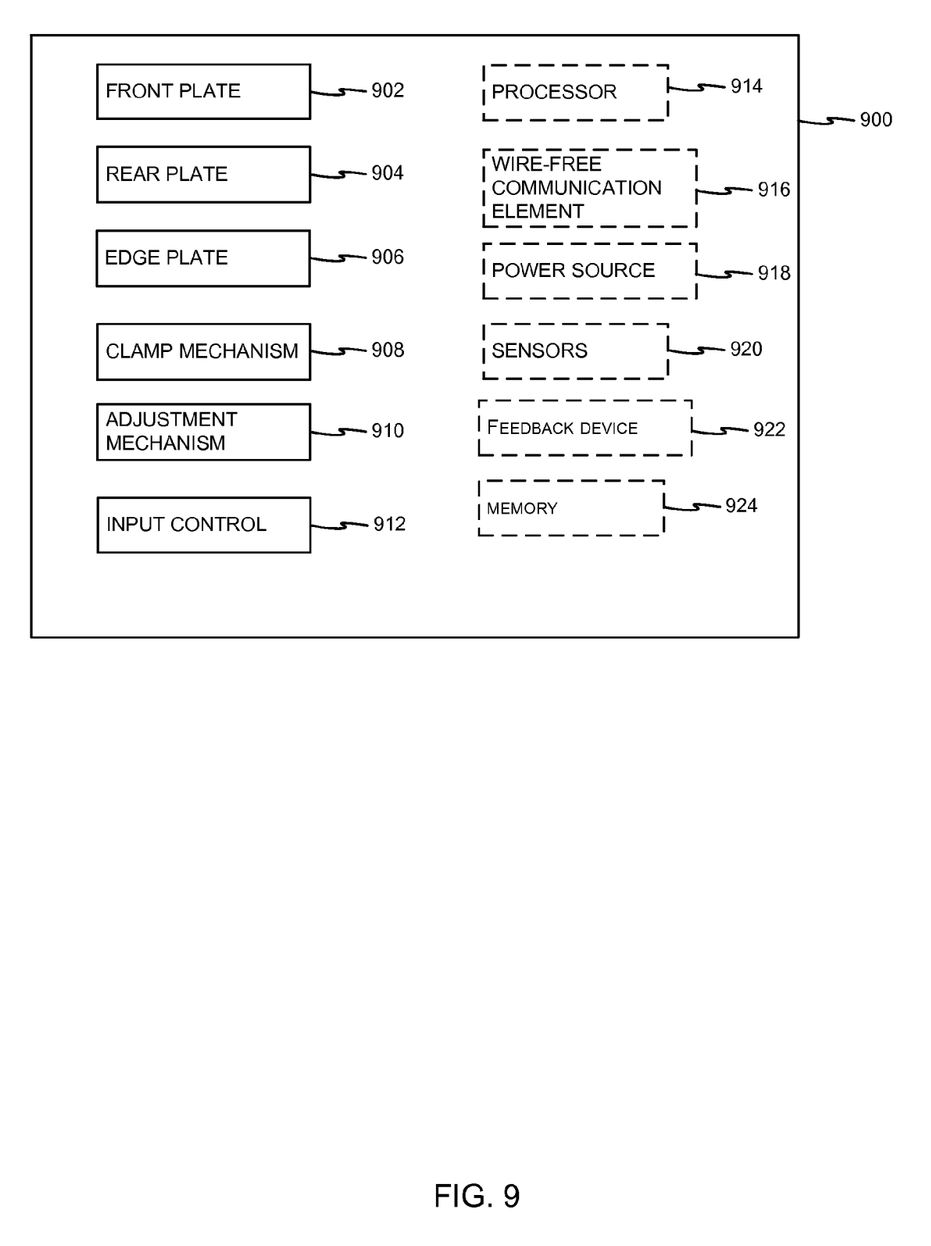
FIG. 9 is a block diagram of an example removable input module.

FIG. 9 is a block diagram of an example input module 900 as described herein. As described above, the input module 900 comprises a front plate 902, a rear plate 904 and an edge plate 906. When attached to a touch-screen device, the front plate contacts a portion of the front face of the device, the rear plate contacts a portion of the rear face of the device and the edge plate contacts a portion of an edge face of the device. The contact between the edge plate and at least a portion of the edge face near to the front (display) face of the device reduces any possible rotation of the module (in the plane of the touch-screen device) whilst attached to the touch-screen device. The contact between the front and rear plates and the front and rear faces of the touch-screen device reduces any possible rotation of the module in a plane perpendicular to the touch-screen device when attached. The input module 900 further comprises a clamp (or attachment) mechanism which provides a clamping force to grip the touch-screen device, where the clamping force is sufficient that the input module does not fall off during use (e.g. such that a user can pick up the touch-screen device to which the input modules are attached and they remain in position) but not so high that it causes damage to the device to which it is attached. The input module 900 also comprises an adjustment mechanism 910 which allows the distance by which the front plate extends beyond the edge plate to be adjusted (e.g. by moving the edge plate and/or the front plate). This allows the input module to be adjusted to accommodate different touch-screen devices with different non-display borders and/or different user interfaces displayed whilst limiting the parts of the display area which are obscured. Furthermore, the input module 900 comprises one or more input controls 912.

In various examples, the input module 900 may further comprise one or more of the following: a processor 914, a wire-free communication element 916, a power source 918 (e.g. a battery), a sensor 920, a feedback device 922 and a memory 924. The input module 900 may also comprise elements not shown in FIG. 9.

The processor 914 may be a microprocessor, controllers or any other suitable type of processor for processing computer executable instructions to control the operation of the input module in order to receive user inputs (via input control 912) and/or provide feedback to a user (via feedback device 922). As described above, the user inputs via the input control 912 are mapped to inputs to software which is displayed on the touch-screen device, where this software may be an application or an operating system. In some examples, for example where a system on a chip architecture is used, the processor 912 may include one or more fixed function blocks (also referred to as accelerators) which implement a part of the method of operating the input module in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions executed by the processor may be provided using any computer-readable media that is accessible by the input module 900. Computer-readable media may include, for example, computer storage media such as memory 924 and communications media. Computer storage media, such as memory 924, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media.

The wire-free communication element 916 is used to communicate with the touch-screen device or with a computing device to which the touch-screen device is connected where the touch-screen device is a peripheral device. Any suitable wire-free technology may be used (e.g. Bluetooth®, IR, sound, etc.). In other examples the wire-free communication element 916 may communicate with the computing device via another device (e.g. a charging dock).

The input control 912 and/or sensors 920 may comprise Natural User Interface (NUI) technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the examples described above relate to a removable module which comprises at least one input control and optionally comprises one or more output devices, in other examples, a removable module may comprise one or more output devices and optionally one or more input controls. A module which comprises only output devices and no input controls may be referred to as a removable output module and may be used, for example, to provide haptic feedback for software (e.g. a game) running on the touch-screen computing device to which the module is attached.

Although many of the present examples are described and illustrated herein as being implemented in a system comprising a touch-screen device and a single removable input module, the system described is provided as an example and not a limitation. As those skilled in the art will appreciate, the present examples are suitable for application in a variety of different types of systems which may comprise different types of touch-screen device and one or more input modules and in some examples, two or more input modules (e.g. as in FIG. 1). Furthermore, although the touch-screen devices are shown as being flat, planar devices, the input modules described herein may also be attached to a curved and/or flexible touch-screen device.

A first further example provides a removable input/output module for a touch-screen device, the touch-screen device comprising a front, touch-sensitive, display face, a rear face and an edge face connecting the front and rear faces, and the removable input/output module comprising: a front plate configured to contact the front face of the touch-screen device; a rear plate configured to contact the rear face of the touch-screen device; an edge plate configured to contact at least a part of the edge face of the touch-screen device proximate to the front face of the touch-screen device; a clamp mechanism configured to provide a force for clamping the front and rear plates onto the touch-screen device; and an adjustment mechanism configured to adjust a relative position of the edge plate and at least one of the front plate and the rear plate.

A second further example provides a removable input/output module for a touch-screen device, the touch-screen device comprising a front, touch-sensitive, display face, a rear face and an edge face connecting the front and rear faces, and the removable input/output module comprising: a front plate configured to contact the front face of the touch-screen device; a rear plate configured to contact the rear face of the touch-screen device; an edge plate configured to contact at least a part of the edge face of the touch-screen device proximate to the front face of the touch-screen device; a clamp mechanism configured to provide a force for clamping the front and rear plates onto the touch-screen device; and a replaceable insert selected from a set of replaceable inserts and comprising the edge plate, wherein the replaceable inserts in the set provide different distances by which the front plate extends beyond the edge plate.

A third further example provides a system comprising a removable input/output module for a touch-screen device and a removable extension piece, the removable input/output module comprising: a front plate configured to contact the front face of the touch-screen device; a rear plate configured to contact the rear face of the touch-screen device; an edge plate configured to contact at least a part of the edge face of the touch-screen device proximate to the front face of the touch-screen device; a clamp mechanism configured to provide a force for clamping the front and rear plates onto the touch-screen device; an adjustment mechanism configured to adjust a distance by which the front plate extends beyond the edge plate; and a connecting mechanism configured to receive the removable extension piece.

A fourth further example provides a removable input/output module for a touch-screen device, the touch-screen device comprising a front, touch-sensitive, display face, a rear face and an edge face connecting the front and rear faces, and the removable input/output module comprising: a front plate configured to contact the front face of the touch-screen device; a rear plate configured to contact the rear face of the touch-screen device; an edge plate configured to contact at least a part of the edge face of the touch-screen device proximate to the front face of the touch-screen device; means for providing a force for clamping the front and rear plates onto the touch-screen device; and means for adjusting a relative position of the edge plate and at least one of the front plate and the rear plate.

In any of the examples described above (including any of the first, third and fourth further examples above), the adjustment mechanism (or means for adjusting) may be configured to adjust a distance by which the front plate extends beyond the edge plate.

In any of the examples described above (including any of the first, third and fourth further examples above), the adjustment mechanism (or means for adjusting) may be configured to move the edge plate relative to the front plate and optionally wherein the rear plate and edge plate are fixed together to form a lower part of the input/output module such that the adjustment mechanism is configured to move the lower part of the input/output module with respect to the front face of the input/output module.

In any of the examples described above (including any of the first, third and fourth further examples above), the adjustment mechanism (or means for adjusting) may comprise a replaceable insert selected from a set of replaceable inserts, each replaceable insert comprising the edge plate and a connecting arm at each end of the edge plate for connecting the insert to a part of the input/output module and wherein different replaceable inserts have different lengths of connecting arms.

In any of the examples described above (including any of the first, third and fourth further examples above), the adjustment mechanism (or means for adjusting) may comprise a replaceable insert selected from a set of replaceable inserts, and wherein a replaceable insert is configured to change a thickness of the edge plate.

In any of the examples described above (including any of the further examples above), the edge plate may be contoured so as to: contact only a part of the edge face of the touch-screen device proximate to the front face of the touch-screen device; and/or provide a recess to accommodate a button on the touch-screen device, a connector plugged into the touch-screen device and/or a cable.

In any of the examples described above (including any of the first, third and fourth further examples above), the adjustment mechanism (or means for adjusting) may comprise a movable joint and wherein the rear plate comprises a first portion proximate to the edge plate and a second portion connected to the first portion by the movable joint and wherein the second portion is configured to contact the rear face of the touch-screen device. The second portion of the rear plate may optionally comprise a non-slip covering, In any of the examples described above (including any of the further examples above), a portion of the front plate may be transparent.

In any of the examples described above (including any of the further examples above), the front plate may have a contoured edge to form two or more protruding portions and a recess between the protruding portions.

In any of the examples described above (including any of the further examples above), the removable input/output module may further comprise a connecting mechanism configured to receive a removable extension piece. The removable extension piece may comprise an input control and/or a feedback device and/or a power source.

In any of the examples described above (including any of the further examples above), the rear plate may comprise a plurality of movable fingers which can be moved to change a size and/or shape of the rear plate.

In any of the examples described above (including any of the further examples above), the removable input/output module may further comprise one or more input controls and/or output devices.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. Propagated signals may be present in a tangible storage media (e.g. they may be stored in a tangible storage media or used in the storage process), but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A removable input module for a touch-screen device, the touch-screen device comprising a front touch-sensitive display face, a rear face and an edge face connecting the front touch-sensitive display face and the rear face, and the removable input module comprising:
   a front plate having a first contact surface configured to contact the front touch-sensitive display face;
   a rear plate having a second contact surface configured to contact the rear face;
   an edge plate between the front plate and the rear plate, the edge plate having a third contact surface configured to contact at least a part of the edge face, the third contact surface being substantially perpendicular to the first contact surface and the edge plate being movable relative to at least one of the front plate and the rear plate; and
   an input control disposed on at least one of the front plate, the rear plate or the edge plate.

2. The removable input module of claim 1, further comprising a clamp mechanism configured to retain the removable input module on the touch-screen device.

3. The removable input module of claim 1, wherein the clamp mechanism comprises a spring biasing the front plate in a direction toward the rear plate to clamp the front and rear plates onto the touch screen device.

4. The removable input module of claim 1, wherein the edge plate is movable relative to the front plate to adjust a distance by which the front plate extends beyond the edge plate.

5. The removable input module of claim 4, wherein the rear plate and edge plate are fixed relative to each other.

6. The removable input module of claim 1, wherein the edge plate comprises a replaceable insert.

7. The removable input module of claim 6, wherein the replaceable insert includes a connecting arm.

8. The removable input module of claim 7, wherein a length of the connecting arm is adjustable.

9. The removable input module of claim 1, wherein the edge plate is contoured so as to contact only a part of the edge face of the touch-screen device.

10. The removable input module of claim 1, wherein the edge plate comprises a recess to accommodate one or more of a button on the touch-screen device, a connector plugged into the touch-screen device and a cable.

11. The removable input module according to claim 1, further comprising a non-slip covering disposed on at least one of the front plate, the rear plate, or the edge plate.

12. The removable input module of claim 1, wherein a portion of the front plate is transparent.

13. The removable input module of claim 1, wherein the front plate has a contoured edge forming two or more protruding portions and a recess between the protruding portions.

14. The removable input module of claim 1, wherein the rear plate comprises a plurality of movable fingers which can be moved to change a size and/or shape of the rear plate.

15. A removable input module for a touch-screen device, the touch-screen device comprising a front face, a rear face and an edge face connecting the front and rear faces, and the removable input module comprising:
   a front plate configured to contact the front face;
   a rear plate configured to contact the rear face;
   an edge plate comprising a replaceable insert, the edge plate being disposed between the front plate and the rear plate and configured to contact at least a part of the edge face of the touch-screen device, the edge plate being movable relative to at least one of the front plate and the rear plate; and
   an input control disposed on at least one of the front plate, the rear plate or the edge plate.

16. The removable input module of claim 15, wherein the replaceable insert includes a connecting arm.

17. The removable input module of claim 16, wherein a length of the connecting arm is adjustable.

18. The removable input module of claim 15, wherein the edge plate is contoured so as to contact only a part of the edge face of the touch-screen device.

19. The removable input module of claim 15, wherein the edge plate comprises a recess to accommodate one or more of a button on the touch-screen device, a connector plugged into the touch-screen device and a cable.

20. The removable input module according to claim 15, further comprising a non-slip covering disposed on at least one of the front plate, the rear plate, or the edge plate.

* * * * *